UNITED STATES PATENT OFFICE

ERIC C. KUNZ, OF MONTCLAIR, NEW JERSEY

PROCESS FOR THE PRODUCTION OF ALCOHOL FROM ALDEHYDES

No Drawing.   Application filed July 14, 1927.   Serial No. 205,842.

This invention relates to a process for the production of alcohols from aldehydes.

The object of the invention is to provide a process which is simple in its execution and capable of producing alcohols of great purity and in commercial quantities without the formation of undesirable by-products.

It is well known that aldehydes are rather unstable bodies which tend to decompose by polymerization, resinification and oxidation, either in the presence of acids or alkalies or sun light or some of these agents combined. In view of the fact that practically all previous methods of reducing aldehydes have involved the use or the generation of acids or alkalies in the reaction, the treatment of aldehydes, particularly their reduction to alcohol, has always been a rather difficult process with unsatisfactory results and small yields. It has been attempted to avoid these difficulties by employing very weak acids, or by trying to limit the point of contact between the aldehydes and the reducing fluid, but these methods have proven to be impractical and the yield small.

It is also known that aldehydes could be reduced in neutral solutions by the employment of metallic magnesium, as, for example, is shown in the German Patent # 384,351, issued Sept. 17, 1923 to the Badische Aniline & Soda Fabrik. However, in this process the magnesium acts solely as a catalyzer and does not enter into the reaction. Furthermore, practical experiments have proven that the magnesium very quickly becomes poisoned and cannot be used over again, thus making this process quite expensive due to the cost of the magnesium.

It is also known that aldehydes can be reduced to alcohols by the use of ethyl aluminates, as described in the U. S. Patent # 1,572,742, issued May 28, 1925, to one Meerwein. This process, however, is quite complicated and in addition gives only moderate yields of alcohol because of the formation of acids in amounts ranging from 15 to 30% of the aldehyde.

It is also known that aldehydes can be reduced to alcohols by the use of aluminum in 80% alcoholic solutions, as described in Ullman Encyclopædia, volume 9, page 573. However, in the practice of this method even more feeble results and yields of alcohol are obtained than in the above.

I have discovered by considerable experiment and research that an aldehyde can be reduced to alcohol in practically quantitative amounts by the employment of a very simple process which does not involve complicated operations or apparatus. The process in its broadest aspect comprises the reduction of aldehydes to alcohols by treating them in an anhydrous alcoholic solution with a metal. Because of the fact that the solvent alcohol used is anhydrous to a very high degree the generation of any acidity or alkalinity in the solution is avoided. The metal combines with the alcohol to form metallic insoluble alcoholates, producing hydrogen which instantly and without liberation from the solution combines with the aldehyde to reduce it to alcohol. Thus by generating hydrogen in the presence of the aldehyde in a neutral anhydrous solution I enable the hydrogen to be taken care of as fast as it is generated so that the danger of its liberation from the solution is avoided and at the same time I form insoluble alcoholates which can be readily transformed back into the solvent alcohol by a simple and well known method. The decomposition of the aldehyde in any of the above mentioned manners is avoided by the lack of any acidity or alkalinity in the solution used.

The preferred metal used is aluminum in as pure a state as is commercially feasible. The solvent alcohol employed is preferably normal butyl alcohol because it is cheap and can be most readily freed from water. However, other alcohols, such as amyl, propyl, ethyl and others may be used. For instance amyl alcohol can be made anhydrous as readily as butyl alcohol, but it is slightly more expensive. This process is adapted for the reduction of any aldehyde, as for example, butyl aldehyde, citronellal benzaldehyde, cinnamic aldehyde, heliotropine and many others. The aluminum may be employed in almost any form, but it is preferably used in the form of shavings or turnings and in slight excess of the theoretical amount needed. It can be used directly without any preparation, but it is preferable to slightly amalgamate it by the well known treatment with corrosive sublimate, with or without the addition of a slight amount of iodine. The amount of solvent alcohol used may vary within wide limits, but the preferred amount is generally about 3½ times the amount of aldehyde used. This process is one which can be conducted at moderate temperatures which may range between 50 to 80° C.

In the general procedure employed the proper amount of aldehyde is mixed with the proper amount of solvent alcohol and then the aluminum is added either at once or in small quantities over a period of several hours, while maintaining the temperature of the solution in the neighborhood of 60° C. The aluminum in this process does not act as a catalyzer, but is completely consumed in proportion to the alcohol formed. When all the aldehyde has disappeared, water or acid is added to transform the aluminum alcoholates back into the solvent alcohol and aluminum hydroxide.

The chemical reactions are exemplified as follows:—

Assuming that I am employing benzaldehyde to be reduced and using aluminum and normal butyl alcohol to effect this result, the reaction can be expressed as follows:

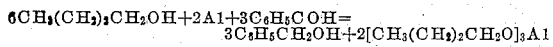

When all the aldeyhyde is reduced the aluminum butylate formed is treated with water to produce butyl alcohol and aluminum hydroxide.

As specific examples of my process I proceed as follows:

1. 72 lbs. of butyl aldehyde are mixed with 210 lbs. of anhydrous normal butyl alcohol, and 20 lbs. aluminum shavings, slightly amalgamated, are added in small quantities over a period of 6 hours while a heat of about 60° C. is maintained. When all the aldehyde has disappeared, water is added and the butyl alcohol formed is distilled off either directly or with the help of steam, and rectified.

2. 106 lbs. of benzaldehyde are mixed with 300 lbs. butyl alcohol and the mixture is slowly run onto 19 lbs. of aluminum and ½ lb. amalgamated aluminum during 5 hours while maintaining a temperature of 50–60° C. The aluminum compounds produced in the reaction are neutralized with acid; the butyl alcohol is recovered by distillation and the benzyl alcohol formed is then either steam or vacuum distilled.

I claim:

1. Process of reducing aldehydes to alcohols comprising treating an aldehyde with aluminum in an anhydrous alcoholic solution at a temperature between 50 to 80° C.

2. Process of reducing aldehydes to alcohols comprising treating an aldehyde with aluminum in an anhydrous alcoholic solution at a temperature approximating 60° C.

3. Process of reducing aldehydes to alcohols comprising forming a solution of an aldehyde with approximately three and a half times its amount of anhydrous alcohol and then adding aluminum and maintaining the temperature of the solution at approximately 60° C.

4. Process of reducing aldehydes to alcohols comprising forming a solution of an aldehyde with approximately three and a half times its amount of anhydrous alcohol and then adding aluminum and maintaining the temperature of the solution at approximately 60° C. over a period of several hours.

5. Process of reducing aldehydes to alcohols comprising mixing 106 pounds of benzaldehyde with 300 pounds of butyl alcohol, adding this mixture to 19 pounds of aluminum and a half pound of amalgamated aluminum and maintaining the temperature of the solution at approximately 60° C over a period of several hours.

6. Process for the production of alcohols comprising reacting comminuted aluminum with an anhydrous alcohol in the presence of an aldehyde at a temperature between 50 to 80° C.

7. Process for the production of alcohols comprising reacting comminuted aluminum with anhydrous butyl alcohol in the presence of an aldehyde at a temperature between 50 to 80° C.

8. Process for the production of alcohols comprising reacting comminuted amalgamated aluminum with an anhydrous alcohol in the presence of an aldehyde at a temperature between 50 to 80° C.

9. Process for the production of alcohols comprising reacting comminuted amalgamated aluminum with anhydrous butyl alcohol in the presence of an aldehyde at a temperature between 50 to 80° C.

10. Process for the production of citronellol comprising reacting comminuted aluminum with an anhydrous alcohol in the presence of citronellal at a temperature between 50 to 80° C.

11. Process for the production of citronellol comprising reacting comminuted amalgamated aluminum with an anhydrous alcohol in the presence of citronellal at a temperature between 50 to 80° C.

Signed at New York city, in the county of New York and State of New York, this 12th day of July, A. D. 1927.

ERIC C. KUNZ.